UNITED STATES PATENT OFFICE.

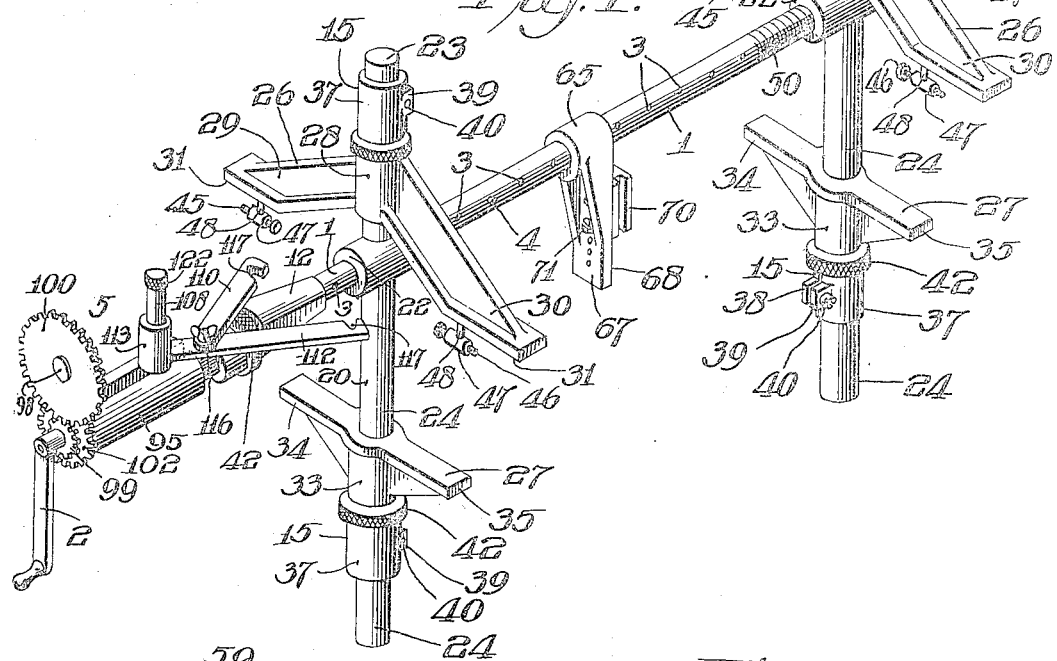

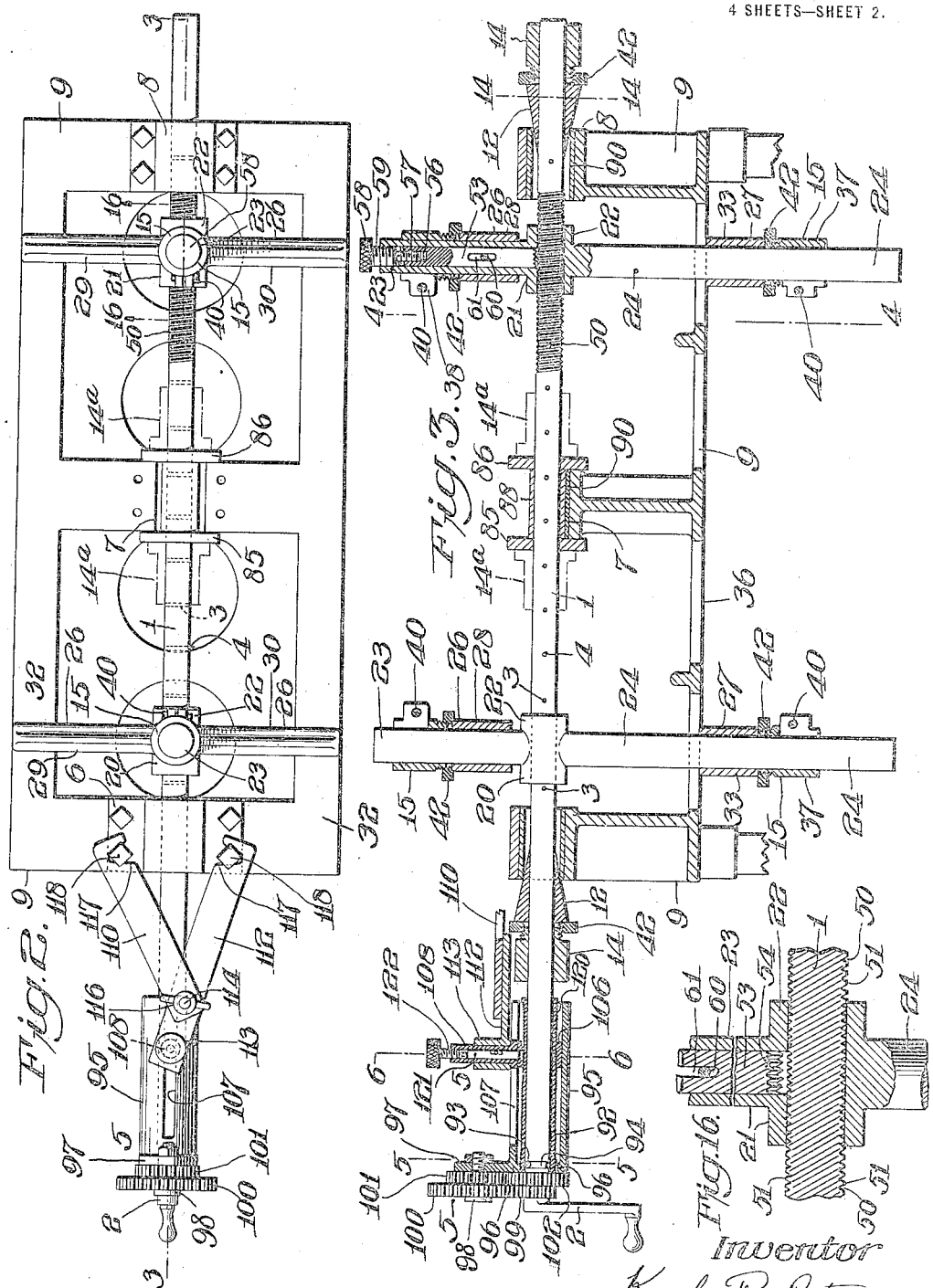

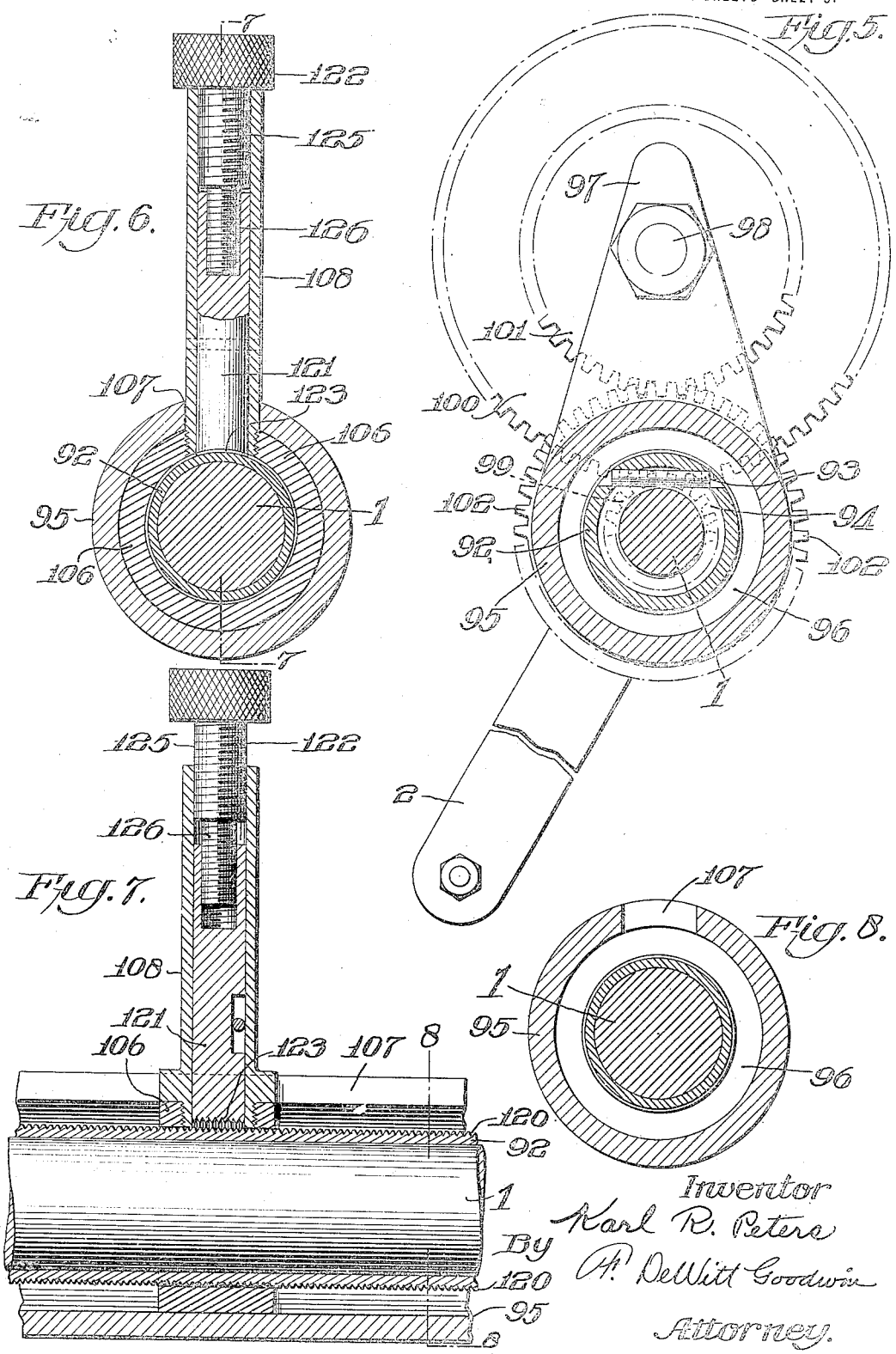

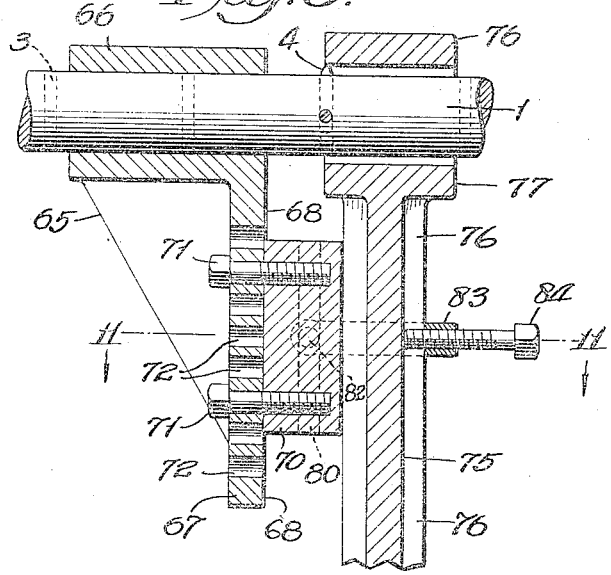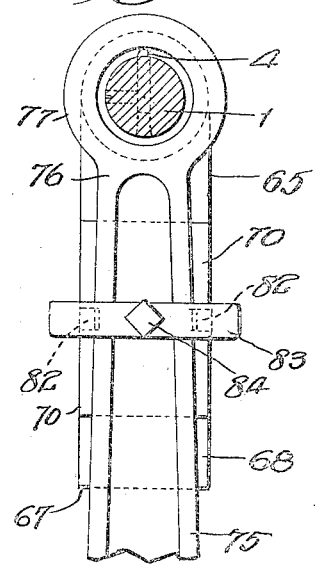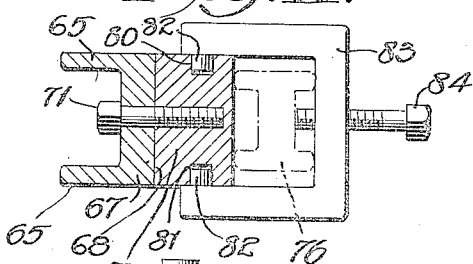

KARL R. PETERS, OF PHILADELPHIA, PENNSYLVANIA.

UNIVERSAL ALIGNMENT BEARING REAMER AND BABBITTING BAR.

1,417,278.  Specification of Letters Patent.  Patented May 23, 1922.

Application filed August 7, 1920. Serial No. 402,071.

*To all whom it may concern:*

Be it known that I, KARL R. PETERS, a citizen of the United States, residing at Philadelphia, in the county of Philadelphia and State of Pennsylvania, have invented certain new and useful Improvements in a Universal Alignment Bearing Reamer and Babbitting Bar, of which the following is a specification.

My invention relates to improvements in a universal alignment bearing reamer and babbitting bar, and particularly relates to a tool for boring and rebabbitting the main bearings of engines and the bearings of connecting rods.

The object of my invention is to construct a tool which may be attached to any size or type of crank casing of an engine, such as used in automobiles, and adaptable either to the type of crank casing which forms part of the cylinders, or to the type of crank casing which is detachable from the cylinders; a further object of my invention is to provide means for quickly assembling and attaching the tool, in proper alignment, upon the crank casing, the tool consisting of two bearing-members mounted upon the boring-bar, each bearing member having arms extending in opposite directions from the boring-bar and at right angles thereto, upon which arms are adjustably mounted brackets, or cross-pieces, adapted to extend across the facing surfaces of the crank casing, which surfaces may be at any distance from the boring-bar; a further object of my invention is to provide novel means for advancing the boring-bar carrying the cutting tool either at fast or slow speed and also embodying means for quickly detaching the feeding mechanism and releasing the boring-bar so that the latter may be passed through the bearing members and through the engine bearings, for adjusting the position of the boring-bar and forming means for quickly returning the tool after a cut has been made; a still further object of my invention is to provide removable centering cones slidably mounted upon the boring-bar for temporarily centering the boring-bar in the bearings of the crank-casing; a still further object of my invention is to provide clamping devices which may be secured either upon the boring-bar for exerting pressure against the said centering cones to draw them tightly together, or secured upon the bearing members for exerting pressure against the brackets to hold the latter firmly upon the crank casing; a still further object of my invention is to provide a bearing arm upon the boring-bar for holding a connecting-rod so that the bearing of the connecting-rod may be bored when the tool is assembled upon the crank casing, to insure the bearing of the connecting-rod being properly centered on the boring-bar by a centering-cone and the bearing thereof rebabbitted and bored at right angles to the connecting-rod, and a still further object of my invention is to provide babbitting collars which may be mounted upon the boring-bar and secured adjacent to the ends of the bearings of the crank casing for rebabbitting the bearings.

Referring to the accompanying drawings; Fig. 1 is a perspective view showing my improved tool; Fig. 2 is a plan view of the tool, shown attached to an engine crank casing, the latter being shown detached from the engine and shown in the inverted position, the centering cones being removed from the boring-bar; Fig. 3 is a longitudinal vertical sectional view, as on line 3—3, Fig. 2, showing the centering cones upon the boring-bar; Fig. 4 is a transverse section on line 4—4, Fig. 3; Fig. 5 is a transverse section on line 5—5, Fig. 3, drawn on a larger scale; Fig. 6 is a transverse section on line 6—6, Fig. 3, drawn on a larger scale, showing the slow speed feeding clutch; Fig. 7 is a longitudinal vertical section on line 7—7, Fig. 6, showing the clutch disengaged; Fig. 8 is a transverse section on line 8—8, Fig. 7; Fig. 9 is a sectional view of the bearing-arm, shown mounted upon the boring-bar, and showing a connecting-rod secured thereto; Fig. 10 is an end view of Fig. 9; Fig. 11 is a horizontal section on line 11—11, Fig. 9; Fig. 12 is a transverse sectional view of the crank-casing and reamer attached thereto, similar to Fig. 4, showing the bearing-arm mounted upon the boring-bar for boring the bearing of a connecting-rod; Fig. 13 is a partial plan view of Fig. 12, showing the centering-cone used for aligning the connecting-rod upon the boring-bar; Fig. 14 is an enlarged section on line 14—14, Fig. 3, showing the centering cone detached; Fig. 15 is a longitudinal central section of the clamping device, used upon the boring-bar and upon the bearing members; and Fig. 16 is an enlarged longitudinal section of the fast speed feeding clutch, as on line 16—16, Fig. 2.

In the accompanying drawings, in which like reference characters refer to like parts, 1 represents the boring-bar, provided with a crank handle 2 detachably secured at one end thereof for rotating the boring-bar. The boring-bar is provided with transverse holes 3, in any one of which may be secured the cutting tool 4, and the boring-bar is also provided with slow speed feeding mechanism 5.

The boring-bar 1 is adapted to be positioned in, and extended through, the bearings 6, 7 and 8 of the crank-casing 9, as shown in Figs. 2, 3 and 4, and the boring-bar 1 is centered in the said bearings by two removable centering cones 12 and 13, shown in Figs. 1, 3 and 14, which are slidably mounted upon the boring-bar 1. The centering-cones are temporarily secured in a fixed position upon the boring-bar 1 by clamping devices 14 adapted to force the centering-cones 12 and 13 tightly into the bearings 6 and 8 of the crank-casing and rigidly hold the boring-bar centered in said bearings. Said centering-cones 12 and 13 are each provided with oppositely disposed flattened surfaces 16 and 17, as shown in Fig. 14, which form spaces for any uneven, projecting or broken surfaces which may be in the bushings of the bearings of the crank-casing, and for bearings which are not round.

The bearing members 20 and 21 each consists of a tubular head 22 adapted to slide upon the boring-bar 1. Each head 22 carries two arms 23 and 24 extending in opposite directions from the head 22 and in alignment with each other. Upon said arms 23 and 24, of each of the bearing members, are mounted brackets or cross-pieces 26 and 27, for holding the bearing members in a fixed position upon the crank-casing 9, so that the centering-cones 12 and 13 and the clamping devices 14 may be removed by withdrawing the boring-bar. The boring-bar is replaced in the bearing members 20 and 21, as shown in Fig. 2, without the centering cones 12 and 13 and the clamping devices 14.

The bracket 26 consists of a central head 28, slidably mounted upon the arm 23. Said head 28 carries oppositely disposed arms 29 and 30 which extend at an oblique angle to each other and form a V-shaped bracket adapted to straddle the boring-bar and thus permit the facing surface 31 of the arms 29 and 30 of the bracket 26 to rest against the facing surfaces 32 of the crank casing 9, as shown in Fig. 4. The bracket 27 consists of a central head 33 slidably mounted on the arm 24 of the bearing member and said head 33 carries oppositely disposed arms 34 and 35 adapted to rest upon the facing surface 36 of the crank casing 9, as shown in Fig. 4.

The brackets 26 and 27 are secured upon the opposite faces 32 and 36 of the crank-casing and the bearing member 20, or 21, is secured between the brackets 26 and 27 by means of clamping devices 15, secured to the rods 23 and 24 of the bearing-members. Said clamping devices 15 are similar in construction to the clamping devices 14 used upon the boring-bar 1.

The said clamping devices 14 and 15 each consists of a split sleeve 37, shown in Fig. 15, having lugs 38 and 39 adapted to be clamped together by a bolt 40 and thus hold the sleeve rigidly upon the rods 23 and 24 or upon the boring-bar 1. The said sleeve 37 is provided at one end with a screw-threaded portion 41, adapted to receive a threaded nut 42, by means of which nut pressure may be exerted against the surface of the cones 12 and 13 or against the brackets 26 and 27, by turning the nut 42, on the sleeve 37, when the sleeve 37 is clamped in a fixed position.

When the bearing-members 20 and 21 are thus secured in a fixed position by the brackets 26 and 27 upon the crank casing 9, the centering cones 14 may be removed, or withdrawn from the bearings of the crank-casing 9. The boring-bar 1, being so mounted in the bearing members 20 and 21, will remain in a central position in relation to the bearings of the crank-casing 9 and said boring-bar 1 may be rotated in the bearing-members 20 and 21.

The brackets 26 are provided with adjusting screws 45 and 46, shown in Fig. 4, by which a lateral adjustment may be given to the said brackets to change the position of the boring-bar 1 in relation to the bearings of the crank-casing 9, after the centering cones are removed, should it be necessary to make any correction in the alignment of the boring-bar. Said adjusting screws 45 and 46 consist of a head 47 in which said screws are mounted. Said head 47 is provided with a tapered shank 48 adapted to be forced into any of the apertures 49 formed in the facing surfaces 31 of the bracket, thus permitting the said adjusting screws to be positioned upon the bracket to suit different sizes of crank-casings.

The boring-bar 1 is provided with a screw-threaded portion 50 located adjacent to the bearing member 21. The said screw-threaded portion 50 is formed in the boring-bar, as shown in section in Fig. 16. The grooves of the said screw-threads are not cut to their full depth, so that a flat bearing surface 51 is left remaining between each groove of the screw-threads of the boring-bar, thus insuring the boring-bar having a true bearing in the head 22 of the bearing member 21, which head 22 is not provided with a screw-thread but has a smooth bore to receive the boring-bar, and form a bearing therefor.

The bearing member 21 is provided with a detachable clutch member 53, having a screw-thread 54 formed in the end thereof, adapted to engage the threaded portion 50 of the boring-bar 1, so that by rotating the boring-bar the clutch member 53 will cause the boring-bar 1 to move longitudinally through the bearing member 21 and thus feed the cutting tool 4, at a relatively fast speed, through the bearing which is to be bored.

The clutch member 53 is made in the form of a rod slidably mounted in the arm 23 of the bearing member 21, and as shown in Fig. 16. The inner end of said rod 53 is provided with the screw-thread 54, which conforms with the screw-thread formed upon the boring-bar 1. The outer end of the rod 53, which forms the clutch member, is provided with a threaded aperture 56, see Fig. 3, into which fits the reduced threaded portion 57 of a bolt 58, for moving the rod 53 into or out of engagement with the boring-bar 1. When the clutch member 53 is withdrawn from engagement with the boring-bar, the latter is free to slide longitudinally through the bearing members, or to be rotated when the slow speed feeding mechanism 5 is in engagement.

The bolt 58 for operating the clutch member 53 is provided with an enlarged portion 59 having a screw-thread formed thereon which engages a screw-thread formed in the arm 23 of the bearing member 21. The reduced portion 57 of the bolt 58 has a greater number of threads per inch than the larger portion 59, thus imparting a relatively slower movement to the clutch member 53. A head is provided for turning the bolt 58 with the fingers and the two threaded shanks 57 and 59 on said bolt will cause the rod 53 to slide in the bearing member when the bolt 58 is rotated. The rod 53 is prevented from rotating in the arm 23 by a pin 60 rigidly secured in said arm 23 and passing through a slot 61 formed in the rod 23.

The bearing-arm 65 for boring the bearing of a connecting rod is shown in Figs. 1, 9 to 13. The bearing-arm 65 consists of a head 66 which fits upon the boring-bar 1, and an arm 67 formed upon said head 66, having a facing surface 68, extending in a plane at right angles to the length of the boring-bar.

The arm 67 of the bearing arm carries an adjustable filling block 70 against the face of which may be secured the arm 75 of a connecting-rod 76. Said filling block 70 is secured upon the arm 67 by bolts 71. A series of apertures 72 is formed in the arm 67 for the bolts 71 so that the block 70 may be moved upon the arm to suit the size of the bearing 77 on the connecting-rod 76. The sides of the block 70 are provided with slots 80 and 81 to receive the pins 82 on the clamp-bracket 83. The latter is provided with a clamp-screw 84 by which the connecting-rod may be secured upon the bearing-arm 65.

A centering cone 12 is used upon the boring-bar 1 for centering the bearing 77 of the connecting-rod, upon the boring-bar 1, as shown in Fig. 13. After the connecting-rod is properly centered upon the boring-bar, the connecting-rod is secured rigidly upon the bearing arm by the clamp-screw 84, so that the centering cone 12 can be removed and the cutting tool 4, on the boring-bar 1, used to rebore the bearing of the connecting-rod by rotating the boring-bar, as above described for reboring the bearings of the crank casing 9. The bearing arm 65 is prevented from rotating with the boring-bar 1 by allowing the outer end of the bearing arms 65 to rest upon the crank-casing 9, as shown in Figs. 12 and 13.

Babbitting collars 85 and 86 are provided for rebabbitting the bearings. Said collars are provided with central apertures the size of the boring-bar 1, upon which they are mounted and they are held adjacent to the ends of a bearing, to be rebabbitted, by the clamping devices 14$^a$, shown in dotted lines, in Fig. 2, similar to the clamping device 14 above described. A sleeve 88 may be provided upon the boring-bar 1 for enlarging the diameter of the boring-bar between the collars 85 and 86 when the bearing to be rebabbitted is larger in diameter than the size of the boring-bar 1. It will be seen that the bearings of the crank-case 9, or the bearing of the connecting-rod 76, may be readily rebabbitted by the use of the collars 85 and 86 secured at either end of the bearing for closing the ends thereof, so that the Babbitt metal 90 may be readily poured into the moulds thus formed by said collars.

The slow speed feeding mechanism 5 consists of a sleeve 92 rotatably mounted upon the boring-bar 1 and held against longitudinal movement thereon by a pin 93 secured in the sleeve 92 and occupying the annular groove 94 formed in the boring-bar 1.

The sleeve 92 is surrounded by a tubular bearing 95, having a reduced portion 96 at one end thereof which rests upon the sleeve 92 so that the latter may rotate therein. A bearing arm 97 is provided upon the tubular bearing 95, having secured thereon a stud-shaft 98 upon which is loosely mounted a large gear 100 and a smaller gear 101, which gears are made in one piece or secured together by any suitable means. Upon the end of the boring-bar 1 is rigidly secured a small gear 99, which meshes with the larger gear 100. A gear 102 is rigidly secured upon one end of the sleeve 92 which meshes with the smaller gear 101. When the boring-bar is rotated by the crank handle 2, a rotary motion is communicated to the sleeve 92, through the gears 99, 100, 101 and 102. The sleeve 92 is thus rotated at a slower speed than the boring-bar 1.

A collar 106 is slidably mounted upon the sleeve 92 and occupies the space between said sleeve 92 and the inner cylindrical surface of the tubular bearing 95. The collar 106 thus forms a support for the body portion of the tubular bearing 95.

The tubular bearing 95 is provided with a longitudinal slot 107, through which extends the hollow post or arm 108, which is secured to the collar 106 or may be made in one piece with said collar. The post 108 is held in a fixed position by a brace made in the form of arms 110 and 112. The latter one of which arms is provided with a head 113 which is slidably mounted upon the post 108. The arm 110 is secured to the arm 112 by a bolt 114 on arm 112 which passes through an aperture formed in the arm 110 and secured by a thumb-nut 116. The outer ends of said arms 110 and 112 are provided with V-shaped notches 117 adapted to embrace the bolts 118 on opposite sides of the bearing 6 of the crank-casing and secured by clamping the bolts 118 tightly upon said arms. Thus holding the post 108 and the collar 106 against either longitudinal or rotary movement.

The sleeve 92 is provided with a flat screw thread 120, similar to the thread 50 upon the boring-bar 1. The collar 106 has a smooth bore so that it may slide upon the threaded portion of the sleeve 92 and have a bearing surface upon said sleeve.

A clutch member 121 is slidably mounted in the hollow post or arm 108. Said clutch member 121 is similar in construction to the clutch member 53, above described, and is raised and lowered in the arm or post 108 by a bolt 122 having coarse and fine threaded portions 125 and 126, respectively. By turning the bolt 122 the clutch member 121, having the screw-thread 123 formed in the end thereof, may be moved into and out of engagement with the screw-thread 120 upon the sleeve 92. When in engagement the clutch member 121 will cause the boring-bar 1 to advance very slowly due to the difference in the sizes of the driving gears which turn the sleeve 92 at a relatively slower speed than the boring-bar is rotated, and the tool 4 upon the boring-bar 1 will be fed very slowly into the bearing which is being rebored.

When it is desired to advance the boring-bar at a greater speed, the clutch member 121 may be withdrawn from the sleeve 92 and the clutch member 53 may be moved into engagement with the threaded portion 50 of the boring-bar 1, which will cause the tool 4 on the boring-bar to be advanced more rapidly into the work. When both clutch members 53 and 121 are withdrawn from engagement, the boring-bar may be quickly moved longitudinally through the bearing members 20 and 21 and the collar 106, to readjust the cutting tool to a new position.

Having thus described my invention, I claim and desire to secure by Letters Patent:

1. A device of the character described adapted to be detachably mounted upon a casing, comprising a boring-bar, bearing members in which the boring-bar is mounted, said bearing members having arms extending in opposite directions from each other and at right angles to the length of the boring-bar, a bracket mounted upon each of said arms and adapted to engage the casing, and fastening devices for securing the brackets upon the said arms and rigidly secure the bearing members upon the casing.

2. A device of the character described adapted to be detachably mounted upon a casing, comprising a boring-bar, bearing members having heads formed thereon in which the boring-bar is mounted, arms upon the said heads extending in opposite directions from said head, a bracket adjustably mounted upon each of said arms, said brackets having arms extending at right angles to the said arms forming part of the bearing members, said brackets adapted to be clamped upon the facing surfaces of the casing and means for holding the said brackets upon the arms of the bearing members.

3. A device of the character described adapted to be detachably mounted upon a casing, comprising a boring-bar, bearing members in which the boring-bar is loosely mounted, arms upon the bearing members extending in opposite directions, a bracket adjustably secured upon each arm adapted to engage opposite faces of the casing and hold the boring-bar centered in the casing, and means for feeding the boring-bar through the bearing members.

4. A device of the character described, adapted to be detachably mounted upon a casing, comprising a boring-bar, bearing members in which the boring-bar is mounted, arms upon the bearing members extending in opposite directions from the boring-bar, brackets having heads slidably mounted upon said arms, each bracket having arms extending in opposite directions from the head and having facing surfaces extending at right angles to the length of the arms of the bearing member, said facing surfaces of the brackets adapted to rest upon opposite faces of the casing, and means for securing the brackets upon the bearing members.

5. A device of the character described adapted to be detachably mounted upon a casing, comprising a boring-bar, bearing members in which the boring-bar is mounted, arms upon the bearing members extending in opposite directions from the boring-bar, brackets adjustably mounted upon said arms for engaging the said casing, one of said brackets having a central head through which said arm passes, and said head having arms extending in opposite directions from said head and at an oblique angle to each other and adapted to straddle the central portion of the bearing member.

6. A device of the character described adapted to be detachably mounted upon a casing, comprising a boring-bar, bearing members in which the boring-bar is mounted, brackets adjustably mounted upon the bearing member and adapted to impinge against opposite faces of the said casing, a clamping device adapted to be rigidly secured upon the bearing member adjacent to the bracket, and an adjustable member mounted between the clamping device and the bracket for varying the distance between said parts.

7. A device of the character described adapted to be detachably mounted upon a casing, comprising a boring-bar, bearing members in which the boring-bar is mounted, brackets adjustably mounted upon the bearing member and adapted to be clamped against opposite faces of the casing, arms upon the bracket extending at right angles to the length of the boring-bar and adapted to span the casing, and an adjusting screw upon which each arm of the bracket for engaging the casing whereby lateral adjustment of the bracket in relation to the casing may be obtained.

8. A device of the character described adapted to be detachably mounted upon a casing, comprising a boring-bar, bearing members in which the boring-bar is mounted, brackets adjustably mounted upon the bearing member and adapted to be clamped against opposite faces of the casing, arms upon the bracket extending at right angles to the length of the boring-bar and adapted to span the casing, said arms having a series of apertures formed in the facing surfaces thereof, adjusting screws, heads having threaded apertures for receiving the adjusting screws, and shanks upon the said heads adapted to enter and be secured in the said apertures formed in the bracket whereby lateral adjustment of the bracket in relation to the casing may be obtained.

9. A device of the character described adapted to be detachably mounted upon an engine crank casing having bearings, comprising a boring-bar, centering cones slidably mounted upon the boring-bar adapted to enter the bearings of the casing, a clamping device adapted to be rigidly secured to the boring-bar adjacent to a centering cone, an adjustable member mounted between the said clamping device and the centering cone for forcing the latter into said bearings to rigidly hold the boring-bar in the said bearings, bearing members in which the boring-bar is mounted, and brackets for securing the said bearing members upon the casing so that the centering cones may be removed from the bearings of the casing.

10. A device of the character described adapted to be detachably secured upon a casing, comprising a boring-bar, bearing members in which the boring-bar is slidably mounted, a sleeve rotatably secured upon the boring-bar, a screw-thread formed upon the outer surface of the sleeve, a clutch member adapted to engage the threaded portion of said sleeve, a fixed bearing in which the clutch member is mounted, and means for rotating the said sleeve at a slower speed than the boring-bar is rotated.

11. A device of the character described adapted to be detachably secured upon a casing, comprising a boring-bar, bearing members in which the boring-bar is slidably mounted, a sleeve rotatably secured upon the boring-bar, a bearing member mounted upon the said sleeve, means upon the said bearing member for communicating rotary motion from the boring-bar to said sleeve, a collar slidably mounted upon the sleeve, a clutch member mounted upon said collar adapted to engage the sleeve and move the boring-bar longitudinally, and means for holding the said collar in a fixed position in relation to the casing.

12. A device of the character described adapted to be detachably secured upon a casing, comprising a boring-bar, bearing members in which the boring-bar is slidably mounted, a sleeve rotatably secured upon the boring-bar, a tubular bearing mounted upon the sleeve, means upon the tubular bearing for communicating rotary motion from the boring-bar to said sleeve, a collar in which the sleeve is slidably mounted, said collar adapted to be embraced by said tubular bearing, said tubular bearing having a longitudinal slot formed therein, a post upon said collar projecting through the said slot in the tubular bearing, a brace upon the post for holding said collar in a fixed position, and a clutch member located upon said collar adapted to engage the sleeve and move the boring-bar longitudinally.

13. A device of the character described adapted to be detachably mounted upon a casing, comprising a boring-bar, bearing members in which the boring-bar is slidably mounted, a clutch member slidably mounted in one of said bearing members, a screw-thread formed upon the boring-bar, said clutch member having a screw-threaded portion adapted to engage the threaded portion of the boring-bar for moving the latter longitudinally through the bearing member when the boring-bar is rotated, a sleeve rotatably secured upon the boring-bar, a screw-thread formed upon the outer surface of the sleeve, means upon the boring-bar for rotating the said sleeve at a slower speed than the boring-bar is rotated, a clutch member adapted to engage the threaded portion of said sleeve, a fixed bearing in which the last mentioned clutch member is held, and means for moving the said clutch members into and out of engagement.

14. A device of the character described adapted to be detachably secured upon a casing, comprising a boring-bar, means for securing the boring-bar upon the casing, a bearing arm loosely mounted upon the boring-bar, said bearing arm having a facing surface extending at right angles to the length of the boring-bar, a fastening device for securing a connecting rod upon the bearing arm with the bearing of the connecting rod held in alignment with the boring-bar, and means for rotating the boring-bar in relation to the bearing arm.

15. A device of the character described adapted to be detachably secured upon a casing, comprising a boring-bar, means for securing the boring-bar upon the casing, a bearing arm loosely mounted upon the boring-bar, said bearing arm having a facing surface extending at right angles to the length of the boring-bar, said bearing arm adapted to carry a connecting rod in a position in which the boring-bar passes through the bearing of the connecting rod, a centering cone mounted upon the boring-bar adapted to be forced into and center the connecting rod bearing upon the boring-bar, and a fastening device for rigidly clamping the connecting rod upon the bearing arm.

16. A device of the character described adapted to be detachably secured upon a casing, comprising a boring-bar, means for securing the boring-bar upon the casing, a bearing arm loosely mounted upon the boring-bar, said bearing arm having a facing surface extending at right angles to the length of the boring-bar, a filling block adjustably mounted upon the facing surface of the bearing arm and having slots formed in opposite sides thereof, a clamp-bracket having pins to enter the said slots in the filling block and adapted to clamp a connecting rod against the face of the filling block with the bearing of the connecting rod in alignment with the boring-bar, and means for rotating the boring-bar in relation to the bearing arm.

17. A device of the character described adapted to be detachably secured upon a casing, comprising a boring-bar, means for securing the boring-bar upon the casing, a bearing arm loosely mounted upon the boring-bar, said bearing arm having a facing surface extending at right angles to the length of the boring-bar, said bearing arm having sufficient length so that its free end will rest upon the casing and be held against rotation, and a clamping device for securing a connecting rod upon the facing surface of the boring arm with the bearing of the connecting rod mounted in alignment upon the boring-bar, and means for rotating the boring-bar in relation to the connecting rod.

In testimony whereof I affix my signature.

KARL R. PETERS.